US011513256B2

(12) United States Patent
Stock et al.

(10) Patent No.: US 11,513,256 B2
(45) Date of Patent: Nov. 29, 2022

(54) SYSTEM AND METHOD FOR SATELLITE OPTICAL GROUND RADIO HYBRID LIGHTNING LOCATION

(71) Applicant: Earth Networks, Inc., Germantown, MD (US)

(72) Inventors: Michael Stock, Damascus, MD (US); Stan Heckman, Chelmsford, MA (US)

(73) Assignee: Earth Networks, Inc., Germantown, MD (US)

(*) Notice: Subject to any disclaimer, the term of this patent is extended or adjusted under 35 U.S.C. 154(b) by 1194 days.

(21) Appl. No.: 15/968,658

(22) Filed: May 1, 2018

(65) Prior Publication Data

US 2018/0321422 A1 Nov. 8, 2018

Related U.S. Application Data

(60) Provisional application No. 62/500,158, filed on May 2, 2017.

(51) Int. Cl.
*G01W 1/16* (2006.01)
*G01S 5/02* (2010.01)
(Continued)

(52) U.S. Cl.
CPC ............ *G01W 1/16* (2013.01); *G01S 5/0263* (2013.01); *G01S 5/14* (2013.01); *G01S 5/16* (2013.01)

(58) Field of Classification Search
CPC ..... G02B 21/02; G02B 3/0087; G01S 5/0263; G01S 5/14; G01S 5/16; G01W 1/16
(Continued)

(56) References Cited

U.S. PATENT DOCUMENTS 7,211,994 B1 * 5/2007 Mergen ............. G01R 29/0842
324/528
2004/0181340 A1 * 9/2004 Smith .................... G08B 21/10
702/3
(Continued)

FOREIGN PATENT DOCUMENTS

JP 3561494 B2 9/2004
WO 2009/111394 9/2009
(Continued)

OTHER PUBLICATIONS

Pessi, Antti, et al., "Relationships among Lightning, Precipitation, and Hydrometeor Characteristics over the North Pacific Ocean, School of Ocean and Earth Science and Technology," University of Hawaii at Manoa, Honolulu, Hawaii, Apr. 2009, pp. 833-846. (Year: 2009).*

(Continued)

*Primary Examiner* — Jeffrey P Aiello
(74) *Attorney, Agent, or Firm* — Cesari & McKenna, LLP

(57) ABSTRACT

Described herein are methods and systems for locating lightning activity. A server computing device receives, from a satellite that detects lightning activity occurring in a geographic region, location coordinates and time data associated with lightning activity detected by the satellite. The server captures, from at least one of one or more ground-based lightning sensors that detect lightning activity, lightning feature data for lightning activity detected by the at least one of one or more ground-based lightning sensors. The server computing device determines a location of the lightning activity within the geographic region using the lightning feature data and the location coordinates and time data. The server computing device transmits the determined location of the lightning activity to one or more remote computing devices.

34 Claims, 12 Drawing Sheets

(51) Int. Cl.
   *G01S 5/14* (2006.01)
   *G01S 5/16* (2006.01)
(58) Field of Classification Search
   USPC ......... 73/170.16, 170.24; 324/72; 340/539.1,
   340/539.11, 539.13, 539.26, 539.28, 601,
   340/506, 905, 635; 342/26 R, 26 B, 460;
   702/1–4, 188–189
   See application file for complete search history.

(56) References Cited

U.S. PATENT DOCUMENTS

| | | | | |
|---|---|---|---|---|
| 2004/0204854 | A1* | 10/2004 | Murphy | G01W 1/16 |
| | | | | 702/4 |
| 2008/0088507 | A1* | 4/2008 | Smith | G01S 5/10 |
| | | | | 342/386 |
| 2008/0091350 | A1* | 4/2008 | Smith | G01C 21/165 |
| | | | | 701/472 |
| 2009/0295587 | A1 | 12/2009 | Gorman, Jr. | |
| 2011/0095763 | A1* | 4/2011 | Linscott | G01V 3/12 |
| | | | | 324/344 |
| 2017/0373822 | A1* | 12/2017 | Gorgen | H04L 7/0012 |

FOREIGN PATENT DOCUMENTS

| | | | |
|---|---|---|---|
| WO | 2009111394 A1 | 9/2009 | |
| WO | WO-2009111394 A1 * | 9/2009 | ............. G01W 1/06 |

OTHER PUBLICATIONS

Rudlosky, Scott D., "Evaluating Ground-Based Lightning Detection Networks using TRMM/LIS Observations," 23rd International Lightning Detection, Tucson, AZ, Mar. 2014 (Year: 2014).*
The Long Range Lightning Detection Network, Global Hydrology Resource Center, Huntsville, AL, 2010 (Year: 2010).*
International Preliminary Report on Patentability for PCT Application No. PCT/2018/030530, dated Nov. 5, 2019, 9 pages.
Cummins, K. et al., "An Overview of Lightning Location Systems: History, Techniques, and Data Uses, With an In-Depth Look at the U.S. NLDN," IEEE Transactions on Electromagnetic Compatibility, IEEE Service Center, New York, NY, vol. 51, No. 3, Aug. 1, 2009, pp. 499-518.
Tierney, Heidi E. et al., "Determination of source thunderstorms for VHF emissions observed by the FORTE satellite," Radio Science, vol. 36, No. 1, Jan. 1, 2001, pp. 79-96.
Bar-Massada, Avi et al., "Combining Satellite-Based Fire Observations and Ground-Based Lightning Detections to Identify Lightning Fires Across the Coterminous USA," IEEE Journal of Selected Topics in Applied Earth Observations and Remote Sensings (2012), 10 pages.
Finke, U. and Hauf, T., "Detect and Locate Lightning Events from Geostationary Satellite Observations," Report Part II, Institut fur Meteorologie und Klimatologie, Universitat Hannover, Oct. 2002, 17 pages.
Machado, Luis A.T. et al, "A Nowcasting System Using Satellite and Radar Data: The CHUVA Project Experience," National Institute for Space Research, Center for Weather Forecast and Climate Studies, 2 pages.
Goodman, Steven J. and Buechler, Dennis E., "Convective Tendency Images Derived from a Combination of Lightning and Satellite Data," Weather and Forecasting, vol. 3, No. 3, Sep. 1988, pp. 173-188.
Machado, Luis A.T. et al., "A Severe Storm Warning System based in Radar and Satellite Data," INPE/CPETEC, Cachoeira Paulista/SP, Brasil, 4 pages.
Miao, Ru et al., "Multi-Year Comparison of Carbon Dioxide from Satellite Data with Ground-Based FTS Measurements (2003-2011)," Remote Sens. 2013, 5, pp. 3431-3456.
Scofield, R.A. et al., "Combining Lightning with Satellite Data for Analysis and Prediction," NOAA/NESDIS/ORA, 5 pages.
Struzik, Piotr, "Storm Early Detection and Monitoring With Use of Satellite Data at the IMWM," Institute of Meteorology and Water Management, Satellite Research Dept., P. Borowego Str. 14, 30-215 Krakow, Poland, 9 pages.
Zhuravlev, R. et al., "Estimating global fluxes of CO2 for 2009-2010 using station and space-borne (GOSAT) observation data with empirical orthogonal functions," Geophysical Research Abstracts, vol. 15, EGU2013-854 (2013), 1 page.
Betcke, Jethro and Beyer, Hans Georg, "Accuracy improvement of irradiation data by combining ground and satellite measurements," Universitat Oldenburg, 1 page.
Cummins, Kenneth L. et al., "An Overview of Lightning Locating Systems: History, Techniques, and Data Uses, With an In-Depth Look at the U.S. NLDN", IEEE Transactions on Electromagnetic Compatibility, IEEE Service Center, New York, NY, vol. 51, No. 3, Aug. 1, 2009, pp. 499-518.
Notification of Transmittal of the International Search Report and the Written Opinion of the International Searching Authority for PCT Application No. 2018/030530, dated Sep. 24, 2018, 16 pages.
Nag, Amitabh et al., "Lighting location systems: Insights on characteristics and validation techniques," Earth and Space Science, 2, doi:10.1002/2014EA000051, Feb. 13, 2015 (29 pages).

* cited by examiner

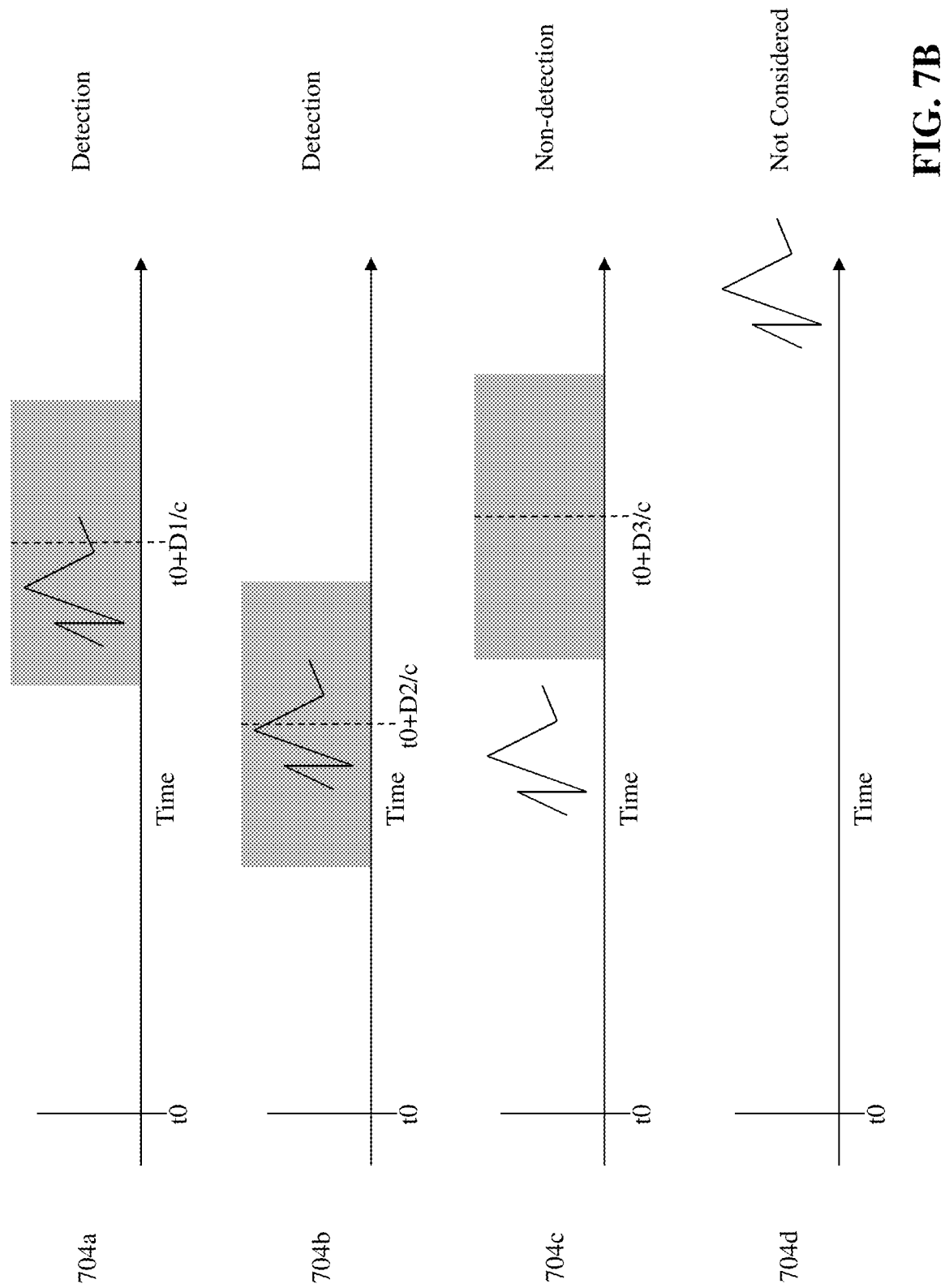

SYSTEM AND METHOD FOR SATELLITE OPTICAL GROUND RADIO HYBRID LIGHTNING LOCATION

TECHNICAL FIELD

This application claims priority to U.S. Provisional Patent Application No. 62/500,158, filed on May 2, 2017, the contents of which are incorporated herein by reference.

TECHNICAL FIELD

This application relates generally to systems and methods, including computer program products, for satellite optical ground radio hybrid lightning location.

BACKGROUND

Both satellite and ground based lightning location systems (LLS's) exist, and operate in different ways. Generally, satellite lightning location systems measure the light emitted by lightning using camera-like sensors to locate the flash. Typical ground-based lightning location systems (such as the Earth Networks Total Lightning Network from Earth Networks, Inc.) measure the radio frequency radiation of lightning in multiple locations, and use time of arrival triangulation techniques to locate the lightning flash.

Just recently, satellite-based LLS's have become useful for the operational detection of lightning with the launch of the Geostationary Lightning Mapper (GLM) over the United States. Previously, satellite LLS's orbited at low Earth orbit, and only provided a limited period of coverage for any specific location during a day (approximately 15 minutes). Because the GLM is in geostationary orbit, its field of view does not change with time, allowing it to provide continuous coverage.

However, ground and satellite LLS's each have certain strengths and weaknesses. Ground-based systems typically have non-uniform detection efficiency (DE), and satellite systems have more uniform high DE. This is because the sensitivity/signal-to-noise ratio (SNR) of ground systems depends on how far one is away from the sensors, and for the satellite systems sensitivity is constant and SNR changes with the background light levels (i.e., lower during the daytime, higher at night). DE of ground-based systems can be higher than satellites if the ground sensor density is high enough, but far away from the sensors (such as over the ocean) it tends not to be.

Satellite systems have lower location accuracy because they are image-based systems. The location accuracy is a function of the number of charge-coupled device (CCD) pixels and the field of view of the lens. For example, on the GLM, one pixel collects light from about a 10×10 km square on the Earth. Ground based systems routinely locate lightning with much better accuracy than that. It is possible to increase the number of pixels on the GLM, but doing so increases cost and reduces SNR.

SUMMARY

Therefore, what is needed are methods and systems for satellite optical ground radio hybrid lightning location that take advantage of the strengths of the satellite system and of the ground-based system to produce more accurate and efficient lightning location. The hybrid lightning location system described herein has the DE of the satellite system, and the LA of the ground-based system. In addition, computational requirements for the ground-based portion of the hybrid lightning location system can be reduced, as the satellite portion of the hybrid system identifies which radio features are produced by the same lightning process, overcoming a major difficulty in existing ground-based location techniques. Alternatively, the hybrid lightning location system can be used to relax the noise reduction algorithms routinely used by LLS's in isolation, by looking for two independent detections.

The invention, in one aspect, features a computerized method of locating lightning activity. A server computing device receives, from a satellite that detects lightning activity occurring in a geographic region, location coordinates and time data associated with lightning activity detected by the satellite. The server computing device captures, from at least one of one or more ground-based lightning sensors that detect lightning activity, lightning feature data for lightning activity detected by the at least one of one or more ground-based lightning sensors. The server computing device generates a plurality of ground point locations based upon the lightning feature data captured from the ground-based lightning sensors. The server computing device compares the ground point locations and the location coordinates received from the satellite to identify one or more sets of matched data. The server computing device augments, for each set of matched data, the location coordinates for the lightning activity received from the satellite with the lightning feature data captured from the ground-based sensors. The server computing device transmits the augmented location coordinates for the lightning activity to one or more remote computing devices.

The invention, in another aspect, features a system for locating lightning activity. The system comprises a server computing device including a memory for storing computer-executable instructions and a processor for executing the computer-executable instructions. The processor executes the computer-executable instructions to receive, from a satellite that detects lightning activity occurring in a geographic region, location coordinates and time data associated with lightning activity detected by the satellite. The processor executes the computer-executable instructions to capture, from at least one of one or more ground-based lightning sensors that detect lightning activity, lightning feature data for lightning activity detected by the at least one of one or more ground-based lightning sensors. The processor executes the computer-executable instructions to generate a plurality of ground point locations based upon the lightning feature data captured from the ground-based lightning sensors. The processor executes the computer-executable instructions to compare the ground point locations and the location coordinates received from the satellite to identify one or more sets of matched data. The processor executes the computer-executable instructions to augment, for each set of matched data, the location coordinates for the lightning activity received from the satellite with the lightning feature data captured from the ground-based sensors. The processor executes the computer-executable instructions to transmit the augmented location coordinates for the lightning activity to one or more remote computing devices.

Either of the above aspects can include one or more of the following features. In some embodiments, the server computing device receives optical energy information associated with the detected lightning activity from the satellite. In some embodiments, the lightning feature data captured from the ground-based lightning sensors comprises radio sferic data.

In some embodiments, generating a plurality of ground point locations comprises combining the radio sferic data received from a plurality of the ground-based lightning sensors and processing the combined data using a time of arrival triangulation algorithm to generate the ground point locations. In some embodiments, each ground point location comprises a location, a classification, an estimated peak current, and an estimated location accuracy.

In some embodiments, the comparing step comprises determining that a lightning event detected by one or more of the ground-based sensors occurred within a predetermined time of a lightning event detected by the satellite and occurred within a predetermined distance from the lightning event detected by the satellite. In some embodiments, the augmenting step comprises appending geographic coordinates, peak current, and classification from the ground-based sensors to group data associated with the satellite.

In some embodiments, the comparing step comprises determining that a lightning event detected by one or more of the ground-based sensors occurred within a predetermined time of a lightning event detected by the satellite, occurred outside a first predetermined distance from the lightning event detected by the satellite, and occurred inside a second predetermined distance of the lightning event detected by the satellite. In some embodiments, the augmenting step comprises appending peak current, and classification from the ground-based sensors to group data associated with the satellite.

In some embodiments, the comparing step comprises determining that a lightning event detected by one or more of the ground-based sensors occurred outside of a predetermined time of a lightning event detected by the satellite or occurred outside a predetermined distance from the lightning event detected by the satellite. In some embodiments, the augmenting step comprises leaving group data associated with the satellite unchanged.

In some embodiments, generating a plurality of ground point locations further comprises: determining a distance from the location coordinates received from the satellite to a location of each of the ground-based sensors; obtaining the radio sferic data from each ground-based sensor that is located within a predetermined distance from the location coordinates received from the satellite; determining an expected arrival time of the radio sferic data obtained from the ground-based sensors; combining the radio sferic data that has an expected arrival time within a predetermined threshold into a collection of radio sferic data; and determining a location of lightning activity associated with the radio sferic data. In some embodiments, determining a location of lightning activity associated with the radio sferic data comprises: a) finding a peak time (tp) and a sensor location (ps) for each radio sferic in the collection of radio sferic data; b) assigning the geographic coordinates (p0) and time data (t0) received from the ground-based sensors as an initial guess location; c) determining location (p) and time (t) for the lightning process using the collection of radio sferic data that minimizes $|t-D(p,ps)/c-tp|$; d) determining a residual value (r) for all radio sferics in the collection of radio sferic data using the equation: $r=t-D(p,ps)/c-tp$; e) if (r) is below a predefined value for each radio sferic, identifying a location of the lightning activity based upon the determined locations for the radio sferics; and f) if (r) is not below a predefined value for at least one radio sferic, removing radio sferics from the collection of radio sferic data that have a residual value (r) above the predefined value and returning to step c).

The invention, in another aspect, features a computerized method of locating lightning activity. A server computing device receives, from a satellite that detects lightning activity occurring in a geographic region, location coordinates and time data associated with lightning activity detected by the satellite. The server computing device captures, from at least one of one or more ground-based lightning sensors that detect lightning activity, lightning feature data for lightning activity detected by the at least one of one or more ground-based lightning sensors. The server computing device identifies at least one of the one or more ground-based lightning sensors in proximity to the geographic region based upon the location coordinates and time data received from the satellite. The server computing device determines a location of the lightning activity using the lightning feature data from the identified ground-based lightning sensors. The server computing device transmits the location of the lightning activity to one or more remote computing devices.

The invention, in another aspect, features a system of location lightning activity. The system comprises a server computing device including a memory for storing computer-executable instructions and a processor for executing the computer-executable instructions. The processor executes the computer-executable instructions to receive, from a satellite that detects lightning activity occurring in a geographic region, location coordinates and time data associated with lightning activity detected by the satellite. The processor executes the computer-executable instructions to capture, from at least one of one or more ground-based lightning sensors that detect lightning activity, lightning feature data for lightning activity detected by the at least one of one or more ground-based lightning sensors. The processor executes the computer-executable instructions to identify at least one of the one or more ground-based lightning sensors in proximity to the geographic region based upon the location coordinates and time data received from the satellite. The processor executes the computer-executable instructions to determine a location of the lightning activity using the lightning feature data from the identified ground-based lightning sensors. The processor executes the computer-executable instructions to transmit the location of the lightning activity to one or more remote computing devices.

Either of the above aspects can include one or more of the following features. In some embodiments, the server computing device receives optical energy information associated with the detected lightning activity from the satellite. In some embodiments, the lightning feature data captured from the ground-based lightning sensors comprises radio sferic data.

In some embodiments, determining a location of the lightning activity comprises determining that a lightning event detected by one or more of the ground-based sensors occurred within a predetermined time of a lightning event detected by the satellite and occurred within a predetermined distance from the lightning event detected by the satellite. In some embodiments, the server computing device appends geographic coordinates, peak current, and classification from the identified ground-based sensors to group data associated with the satellite.

In some embodiments, determining a location of the lightning activity comprises determining that a lightning event detected by one or more of the ground-based sensors occurred within a predetermined time of a lightning event detected by the satellite, occurred outside a first predetermined distance from the lightning event detected by the satellite, and occurred inside a second predetermined distance of the lightning event detected by the satellite. In some embodiments, the server computing device appends peak current, and classification from the identified ground-based sensors to group data associated with the satellite.

In some embodiments, determining a location of the lightning activity comprises determining that a lightning event detected by one or more of the ground-based sensors occurred outside of a predetermined time of a lightning event detected by the satellite or occurred outside a predetermined distance from the lightning event detected by the satellite. In some embodiments, the server computing device leaves group data associated with the satellite unchanged.

In some embodiments, identifying at least one of the one or more ground-based lightning sensors in proximity to the geographic region comprises: determining a distance from the location coordinates received from the satellite to a location of each of the ground-based sensors; obtaining the radio sferic data from each ground-based sensor that is located within a predetermined distance from the location coordinates received from the satellite; determining an expected arrival time of the radio sferic data obtained from the ground-based sensors; and combining the radio sferic data that has an expected arrival time within a predetermined threshold into a collection of radio sferic data. In some embodiments, identifying at least one of the one or more ground-based lightning sensors in proximity to the geographic region further comprises: a) finding a peak time (tp) and a sensor location (ps) for each radio sferic in the collection of radio sferic data; b) assigning the geographic coordinates (p0) and time data (t0) received from the ground-based sensors as an initial guess location; c) determining location (p) and time (t) for the lightning process using the collection of radio sferic data that minimizes |t−D(p,ps)/c−tp|; d) determining a residual value (r) for all radio sferics in the collection of radio sferic data using the equation: r=t−D(p,ps)/c−tp; e) if (r) is below a predefined value for each radio sferic, identifying a location of the lightning activity based upon the determined locations for the radio sferics; and f) if (r) is not below a predefined value for at least one radio sferic, removing radio sferics from the collection of radio sferic data that have a residual value (r) above the predefined value and returning to step c).

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 7A and 7B are diagrams relating to identifying radio sferics from ground-based sensors that correspond to lightning

DETAILED DESCRIPTION

Figure 1:
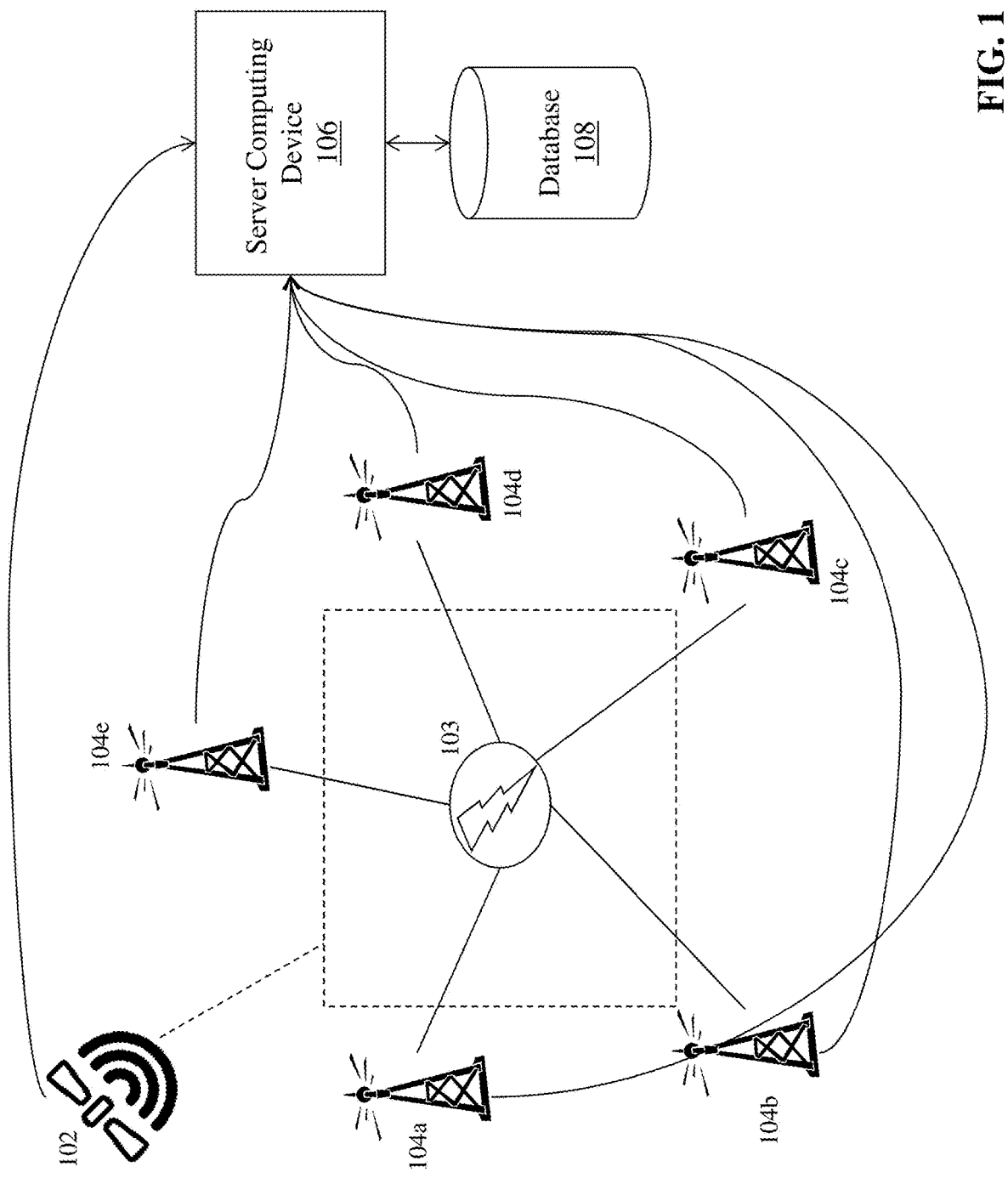
FIG. 1 is a block diagram of a hybrid satellite and ground-based system for lightning location.

FIG. 1 is a block diagram of a hybrid satellite and ground-based system 100 for lightning location. The system 100 comprises a satellite 102 that captures a first set of data associated with a lightning flash 103, a plurality of ground-based sensors 104a-104e (collectively, 104) that capture a second set of data associated with a lightning flash, and a server computing device 106 that is coupled to the satellite 102 and the ground-based sensors 104 in order to receive data from the satellite 102 and the ground-based sensors 104. The server computing device 106 includes a database 108 for, e.g., storing and retrieving data associated with the techniques described herein. The satellite 102, the ground-based sensors 104 and the server computing device 106 can be arranged to communicate via a communications network, e.g., in order to exchange data as described herein.

Exemplary ground-based sensors 104 include, but are not limited to, lightning detection sensors available from Earth Networks, Inc. of Germantown, Md. In some embodiments, the sensors 104 are configured to connect to the server computing device 106 via TCP/IP and transmit lightning data back to the server computing device at periodic intervals (e.g., every second).

Figure 2:
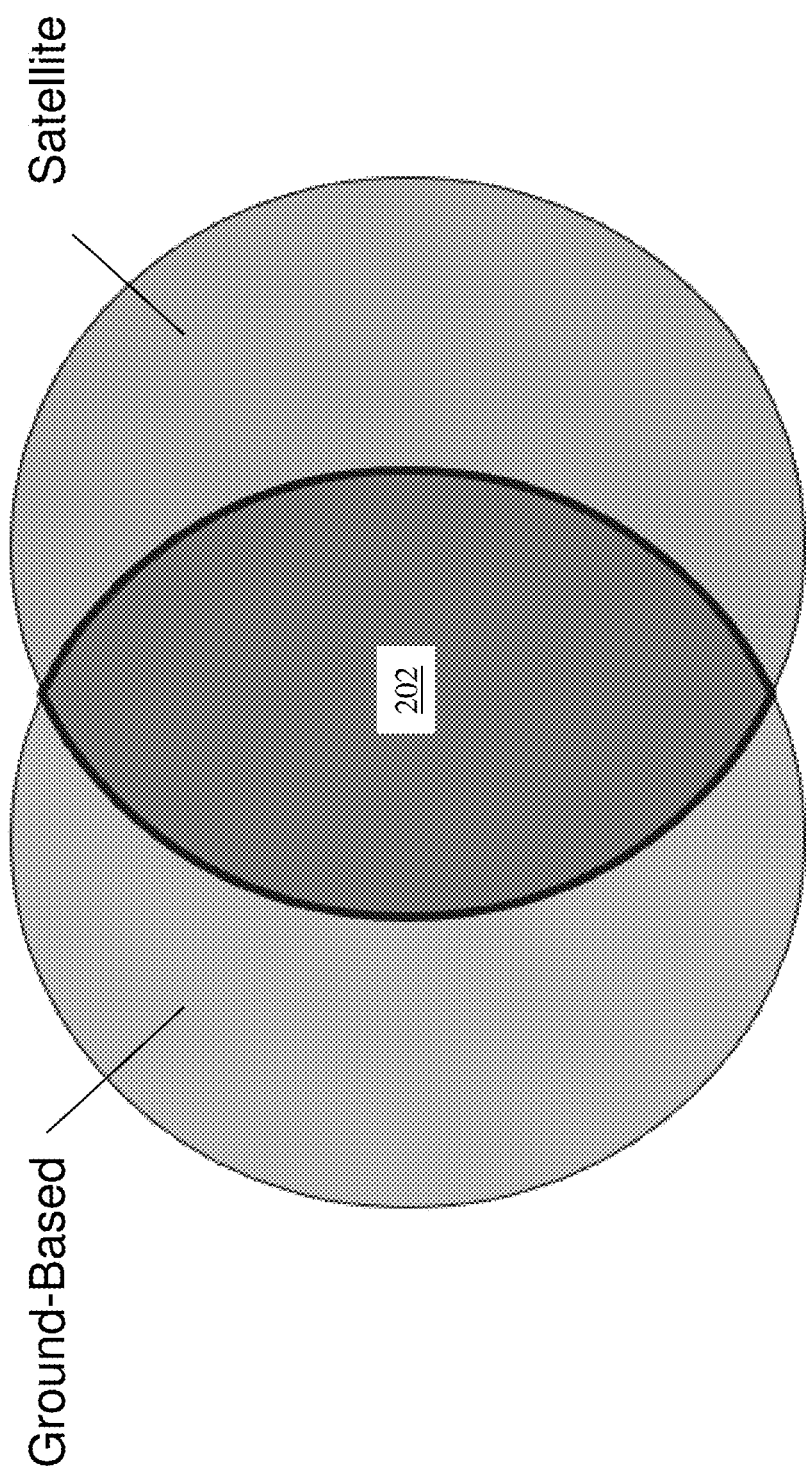
FIG. 2 is a Venn diagram showing overlap in detection between the satellite and the ground-based sensors

Generally, the satellite 102 is used as the initial lightning locator, although both the satellite 102 and the ground-based sensors 104 see slightly different signals at slightly different times. Both the satellite 102 and the ground-based sensors 104 locate approximately the same amount of lightning pulses over the U.S., but only about 60% of these located pulses match in time and space. FIG. 2 is a Venn diagram showing the overlap in detection between the satellite 102 and the ground-based sensors 104; the present system 100 provides locations, peak currents, and classifications for the lightning pulses in the overlap region 202.

The system 100 of FIG. 1 can perform the above-referenced lightning location determination in two different ways:

1) Locate, Then Merge

In this embodiment, the satellite 102 and the ground-based sensors 104 detect and locate lightning flashes independently, and transmit the location data to the server computing device 106. The server computing device 106 then compares the respective locations received from each of the satellite 102 and the ground-based sensors 104 to determine which signals are due to lightning, and which signals are due to noise. For example, the satellite data can be used to determine which of the ground-based sensor locations are due to noise—which allows relaxation of normal noise reduction routines in the ground-based sensors 104 and thereby increase the number of matches.

Figure 3:
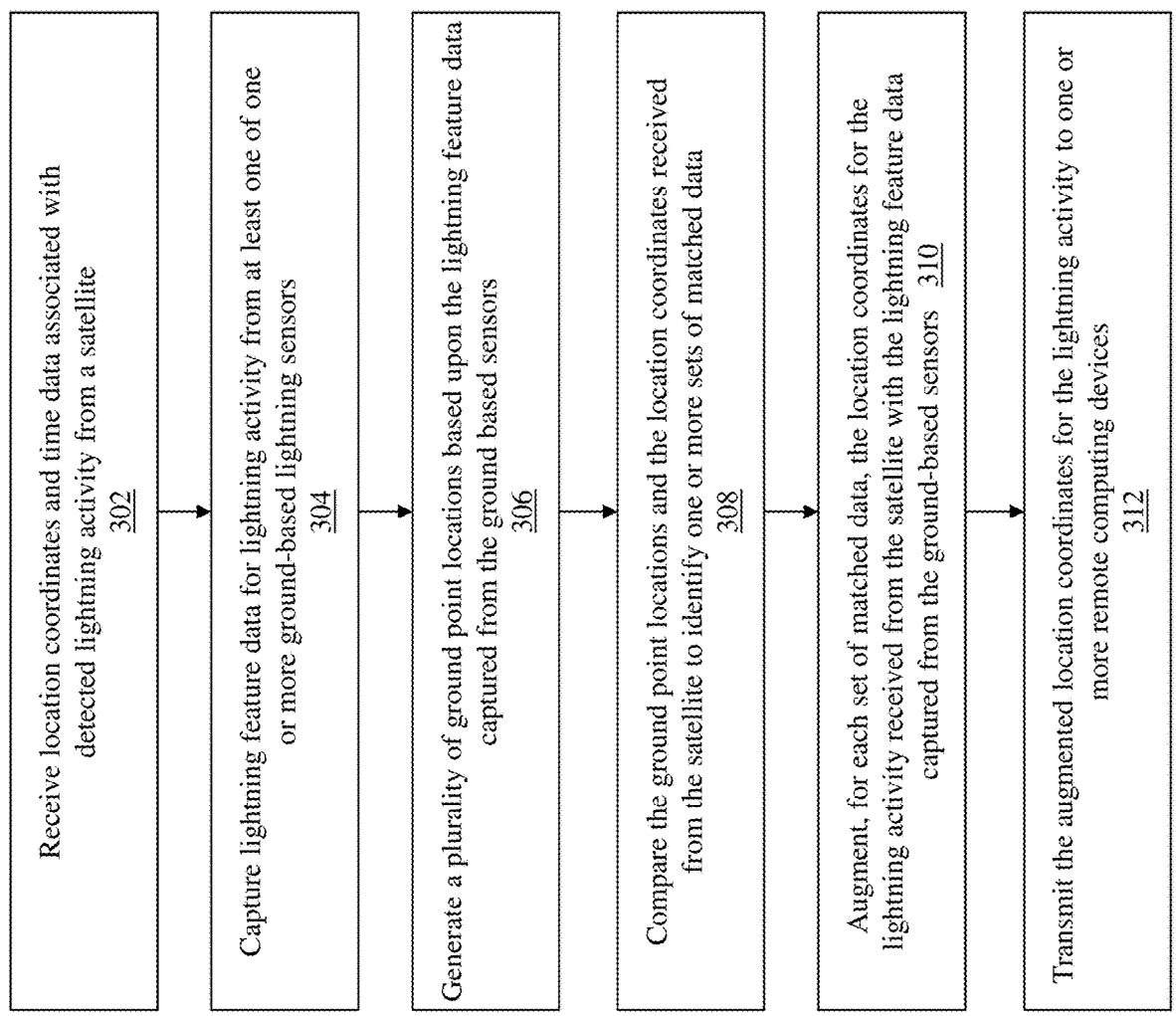
FIG. 3 is a flow diagram of a first exemplary method of locating lightning activity using the hybrid satellite and ground-based system.

FIG. 3 is a flow diagram of a first exemplary method 300 of locating lightning activity, using the hybrid satellite and ground-based system 100 of FIG. 1. The server computing device 106 receives (302) location coordinates and time data associated with detected lightning activity from satellite 102. The satellite detects lightning process (e.g., groups of lightning flashes) in a geographic region on the ground using one or more optical sensors. For example, the satellite 102 detects optical energy associated with the lightning process in a geographic region (e.g., 10-20 km across) within a defined time window (e.g., 4 ms). The satellite 102 records the approximate position (e.g., latitude and longitude ±10 km) and time (e.g., timestamp ±4 ms) of the lightning process. The satellite 102 transmits the optical energy data, the approximate position, and the time to the server computing device 106.

In the United States, for example, an exemplary satellite is operated by the National Aeronautics and Space Administration (NASA), and includes an optical sensor that detects the light produced by lightning using a lens and CCD sensor. In the case of the NASA satellite, five hundred lightning images of the planet are taken every second, with a 'full disk' field of view. Specifics of implementation vary for different satellites, but the algorithm described here works in all cases. The satellite data is quality checked and then is made available to the server computing device 106 via standard internet connection (i.e., TCP/IP). The satellite data typically arrives at the server computing device 106 approximately twenty to forty seconds after the lightning occurs, in netCDF format. Generally, the satellite data arrives as events (pixels from the camera sensors), groups (groups of spatially contiguous pixels in the same frame, 2 ms), and flashes (clusters of groups nearby in space and time). Each event is coded with its location on the surface of the planet, and the time it occurred, along with other information. Because certain quality controls are already applied, all solutions coming from the satellite can be assumed to have been produced by lightning.

At approximately the same time, the server computing device 106 captures (304) lightning feature data (e.g., RF electromagnetic signal from the lightning) for lightning activity from at least one of the one or more ground-based lightning sensors 104 (e.g., ground radio sferic sensors). It should be appreciated that there are typically numerous ground-based sensors (at least five, in practice hundreds) distributed over the region of interest (in this case, the continental United States, but other regions exist, for example, Brazil, Europe, etc.) in known locations. These ground-based sensors detect the radio signal produced by lightning (radio sferic) and transmit the signal in digital form to the server computing device 106 via standard internet protocol (i.e., TCP/IP). In some embodiments, the server computing device 106 receives data from each sensor every second and the data can be transmitted in a proprietary digital format.

The server computing device 106 combines the radio sferic data received from the various ground-based sensors and processes the combined radio sferic data using a time of arrival triangulation algorithm to generate (306) a plurality of ground network point locations from the radio sferics. Each ground point location includes a location (latitude, longitude), classification (IC, CG), an estimated peak current (kiloamps), and an estimated location accuracy (kilometers). In some embodiments, the ground point location data is generated in JSON format. Ground-based sensor data arrives as pulses (location of a single electric field sferic), and flashes (clusters of pulses nearby in space and time).

Figure 4:
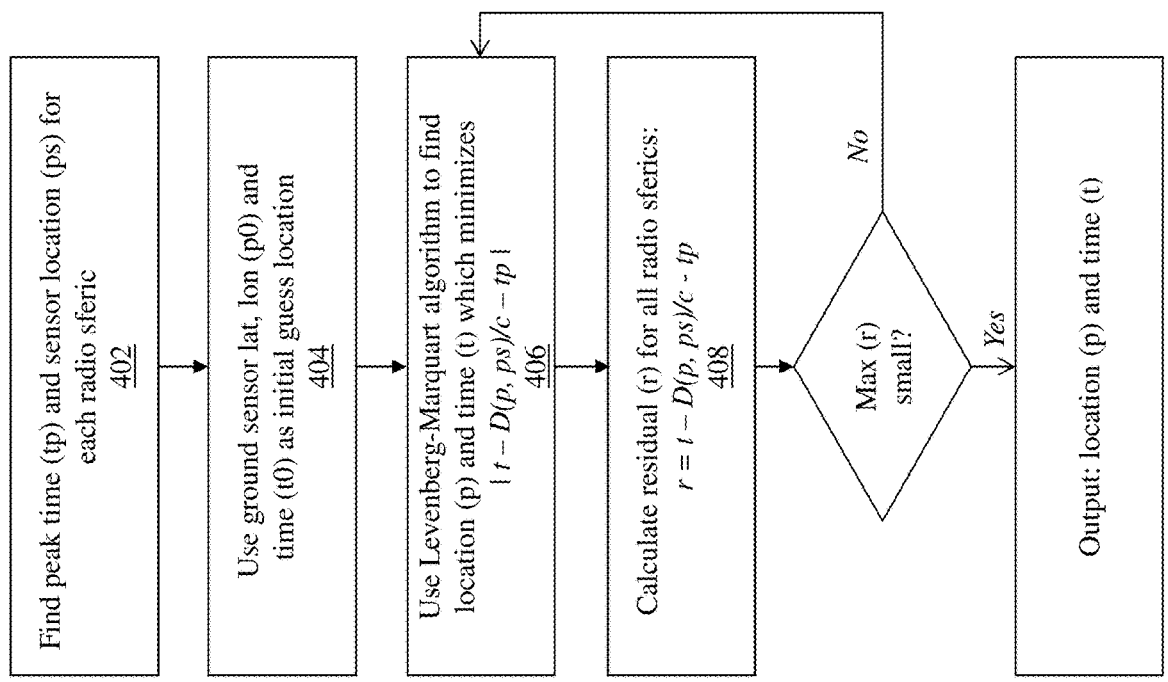
FIG. 4 is a flow diagram of a method for determining if of radio sferics converges on a location using ground sensor-based location as an initial guess.

FIG. 4 is a flow diagram of a method 400 for determining if the radio sferics converge on a location.

At step 402, the server computing device 106 finds peak times (tp) and sensor locations (ps) for each radio sferic;

At step 404, the server computing device 106 uses location (lat, lon) (p0) and time (t0) of the ground network point location as the initial guess location;

At step 406, the server computing device 106 uses a Levenberg-Marquardt algorithm to find location (p) and time (t) which minimizes |t−D (p,ps)/c−tp| for all radio sferics—where D(p, ps) is the distance between locations p and ps;

At step 408, the server computing device 106 calculates the residual (r) for all radio sferics: r=t−D(p,ps)/c−tp;

If r is small enough for all radio sferics, the server computing device 106 has determined that the radio sferics have converged on a location. Otherwise, the server computing device 106 removes the radio sferic associated with the largest residual r and goes back to step 406.

An exemplary time of arrival triangulation algorithm is described in U.S. Pat. No. 8,275,548, titled "Method and apparatus for detecting lightning activity," which is incorporated herein by reference. In some embodiments, the time of arrival triangulation algorithm is modified to remove certain quality checking that is normally done, which produces many more lightning location solutions but of course with far more false locations. The false locations are removed during the matching phase as described below.

Figure 5:
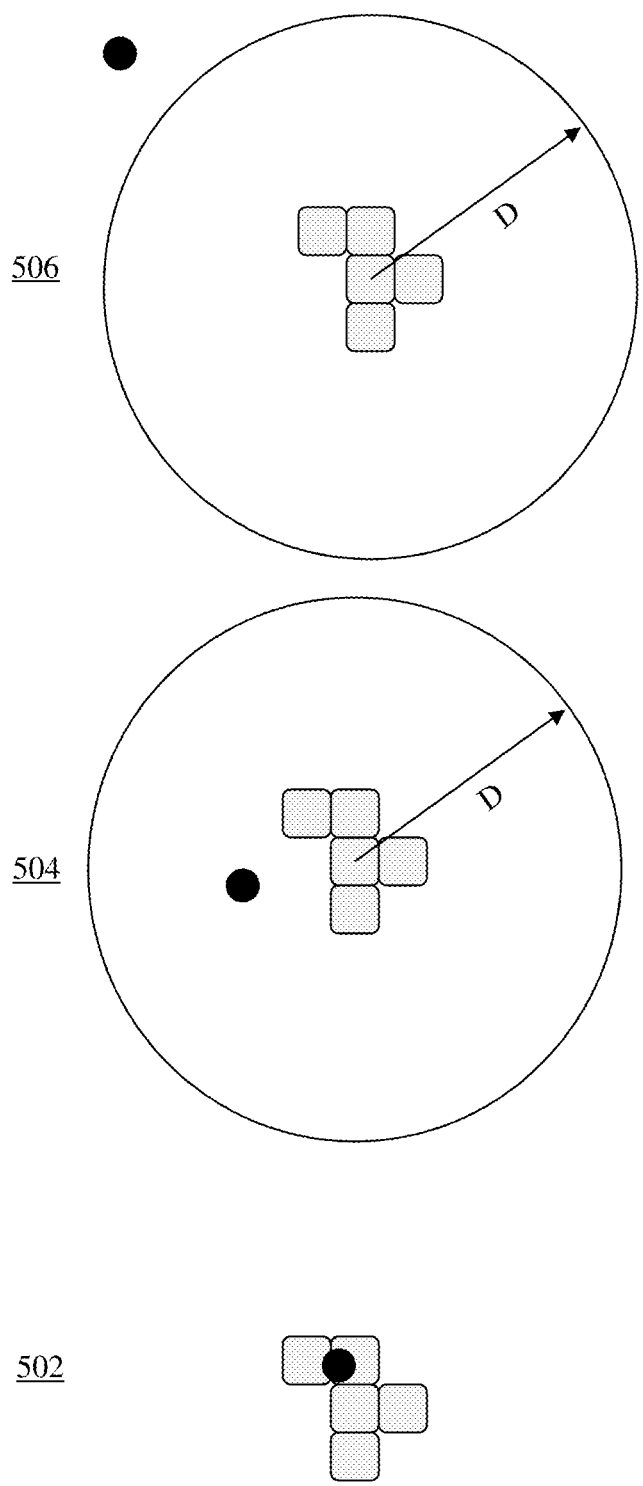
FIG. 5 is a diagram showing a comparison of a location of radio sferics to a centroid location of a satellite group.

The server computing device 106 waits for both the satellite 102 and the ground-based sensors 104 to deliver locations for lightning, and then compares (308) the determined location from the ground-based sensor radio sferic data and the location coordinates received from satellite 102 to identify one or more sets of matched data. There are a number of different possibilities that can happen, as shown in FIG. 5, which is a diagram showing a comparison of a location of radio sferics to a centroid location of a satellite group.

Case 1: If the satellite 102 detects an event, and the ground-based sensors 104 detect the same event within the defined time window (e.g., +/−4 ms), and inside the event footprint defined by the satellite 102, the server computing device 106 considers this event a match (see 502 of FIG. 5). In this case, the server computing device 106 augments (310) the satellite data (e.g., GLM group data) is using the location (lat, lon), peak current, and classification information from the ground-based sensors 104.

Case 2: If the satellite 102 detects an event, and the ground-based sensors 104 detect the same event within the defined time window (e.g., +/−4 ms), and outside the event footprint defined by the satellite but within a defined threshold (e.g., 75 km), the server computing device 106 considers these events to be related (see 504 of FIG. 5). Both the satellite 102 and the ground-based sensors 104 are likely seeing the same physical lightning process, but for some reason the solution to the location is not converging. In this case, the server computing device 106 augments (310) the satellite data (e.g., GLM group data) with the peak current and classification information from the ground-based sensors 104.

Case 3: If the satellite 102 detects an event, but the ground-based sensors 104 do not (or the ground-based location does not meet the requirements as set forth in Cases 1 and 2 above) (see 506 of FIG. 5), the server computing device 106 does not determine a match and the server computing device 106 does not augment the satellite data (e.g., GLM group data).

Generally, the output data generated by the server computing device 106 is in netCDF format—similar to the format of the satellite 102 data, but with some additional fields for the additional information. In some embodiments, the server computing device 106 makes the output data available to further services, products, alerts, visualizations, and remote client computing devices (e.g., smartphones, tablets, smart watches, IoT devices, and the like).

In some embodiments, matching is only done in one direction, i.e., satellite data is used to determine which of the ground-based sensor locations are due to noise, or ground data is used to determine which of the satellite-based sensor locations are due to noise.

In some embodiments, matching is done in both directions, i.e. ground data is used to determine which satellite data is due to noise, and satellite data is used to determine which ground data is based on noise. When matching is done in both directions, the number of ground-based point locations which are matched to satellite-based area locations is maximized.

2) Locate while Merging

In this embodiment, the satellite optical location is used as a prior guess for the ground-based sensor network solution. This greatly simplifies the ground-based network solution, and maximizes the probability of locating the lightning event while minimizing the computation time required.

Figure 6:
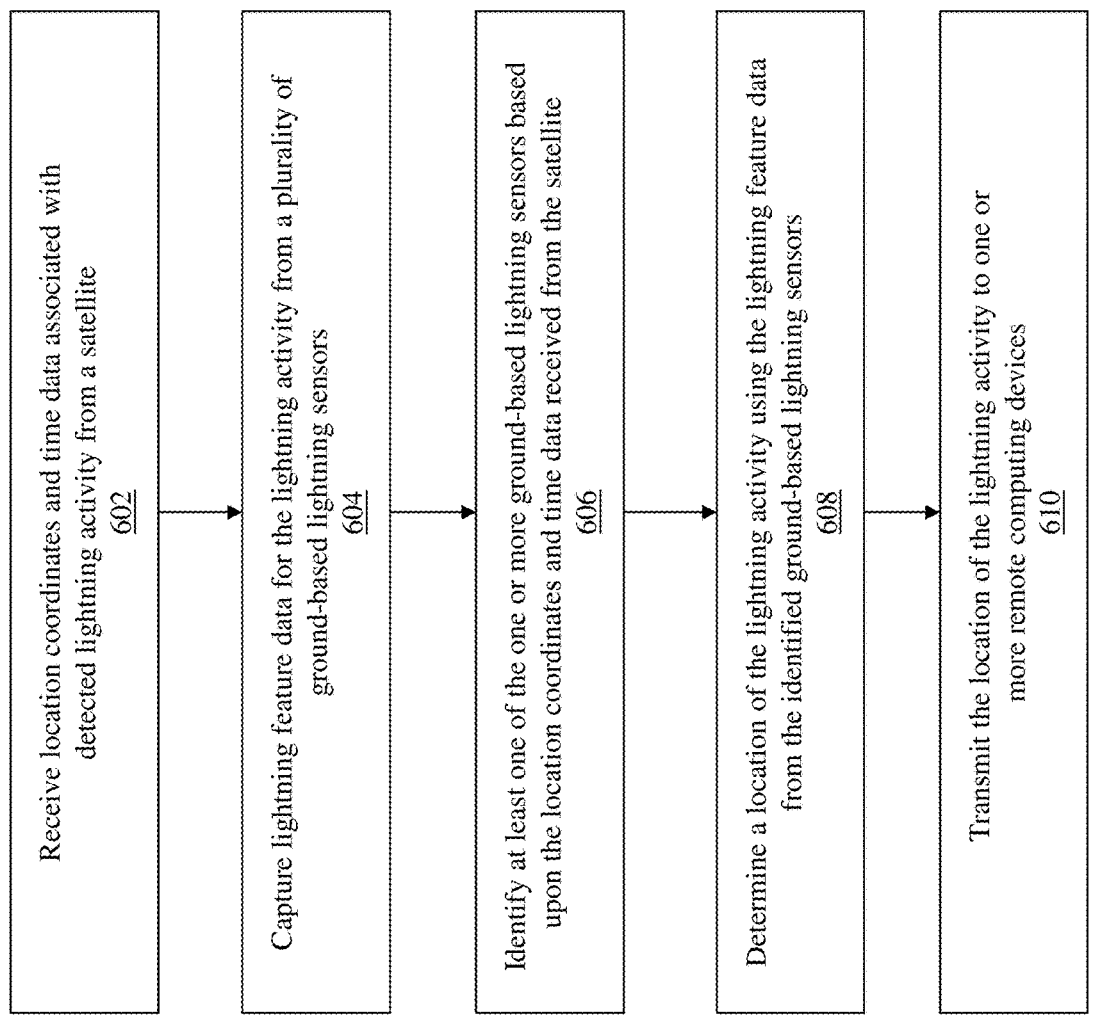
FIG. 6 is a flow diagram of a first exemplary method of locating lightning activity using the hybrid satellite and ground-based system

FIG. 6 is a flow diagram of a second exemplary method 600 of locating lightning activity, using the hybrid satellite and ground-based system 100 of FIG. 1. The server computing device 106 captures (602) data (e.g., location coordinates and time data) from the optical sensor of satellite 102. As noted above, the satellite data is quality checked and then is made available to the server computing device 106 via standard internet connection (i.e., TCP/IP). The satellite data typically arrives at the server computing device 106 approximately twenty to forty seconds after the lightning occurs, in netCDF format. Generally, the satellite data arrives as events (pixels from the camera sensors), groups (groups of spatially contiguous pixels in the same frame, 2 ms), and flashes (clusters of groups nearby in space and time). Each event is coded with its location on the surface of the planet, and the time it occurred. Because certain quality controls are already applied, all solutions coming from the satellite should be produced by lightning.

At approximately the same time, the server computing device 106 captures (604) lightning feature data (e.g., raw radio sferic data) from a plurality of sensors in the network of ground-based sensors 104 (e.g., ground radio sferic sensors). As noted above, there are typically numerous ground-based sensors (at least five, in practice hundreds) distributed over the region of interest (in this case, the continental United States, but other regions exist, for example, Brazil, Europe, etc.) in known locations. These ground-based sensors detect the radio signal produced by lightning (radio sferic) and transmit the signal in digital form to the server computing device 106 via standard internet protocol (i.e., TCP/IP). In some embodiments, the server computing device 106 receives data from each sensor every second and the data can be transmitted in a proprietary digital format.

The server computing device 106 uses the satellite data to identify (606) one or more of the plurality of ground-based sensors 104 for which portions of the radio sferics should have signals produced by lightning. In a preferred embodiment, the server computing device 106 identifies at least four ground-based sensors 104 that observed the lightning process detected by the satellite 102. The sensors can be identified based upon, e.g., distance from the approximate position of the lightning pulse as received from the satellite 102, and background noise level. In some embodiments, the system 100 can detect the radio signature of lightning about 1,000 km out for most sensor sites, but this distance can be increased if the noise level at the site is low (at best, around 2,000 km). Also, the system can implement ionospheric bounces, which enables the detection of the signature of large events that are even further away. In one example, the server computing device 106 uses a signal quality metric to evaluate the signal(s) detected by the sensors and combines that with, e.g., range of the sensor to determine which sensor sites to pull lightning data from.

Figure 7A:
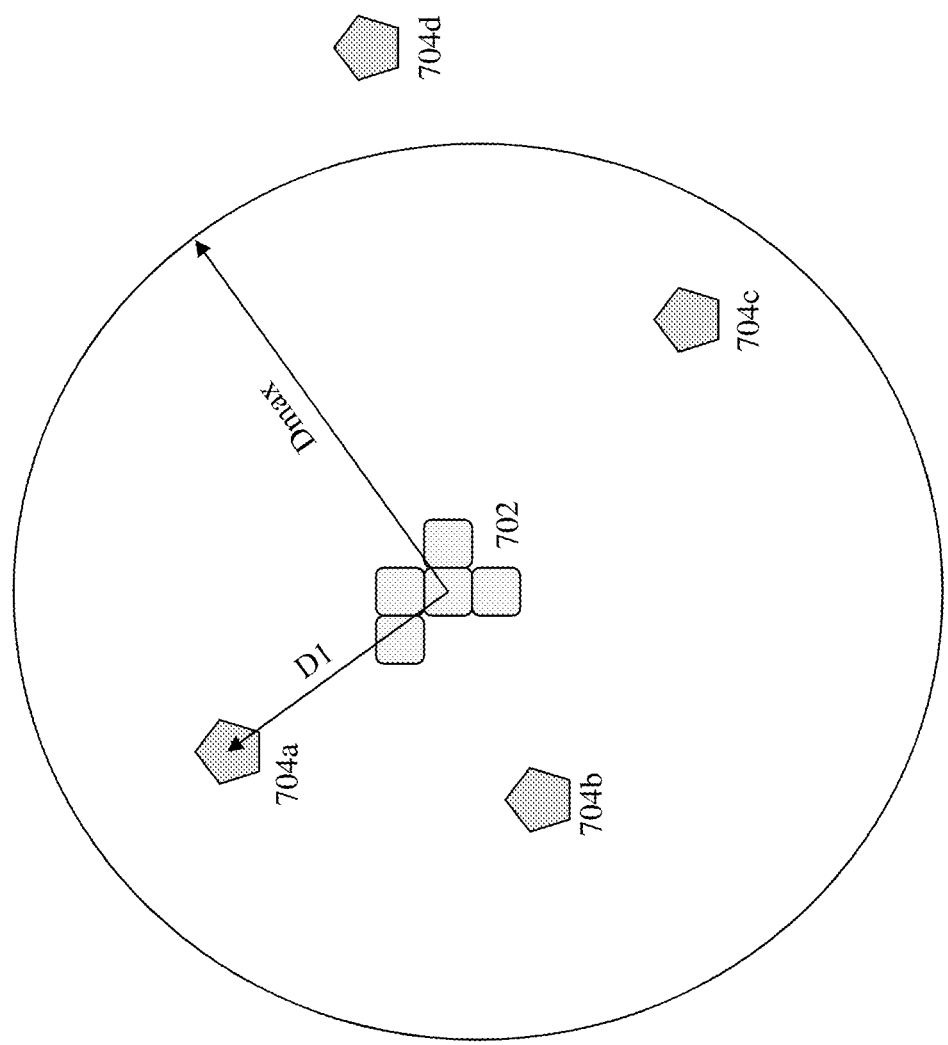

FIGS. 7A and 7B are diagrams relating to identifying radio sferics from ground-based sensors that correspond to lightning. The server computing device 106 obtains a satellite group (e.g., 402 in FIG. 7A) from, e.g., a satellite data feed—the satellite group has a time (t0) and a location lat, lon (p0). The server computing device 106 determines a distance (D) from the centroid of the satellite group 402 to all ground-based sensors (e.g., sensors 704a-704d in FIG. 7A). The server computing device 106 then reads sferic data for all ground-based sensors that are closer than a certain distance (e.g., 1,000 km) from the centroid of the group (e.g., sensors 704a-704c in FIG. 7A).

The server computing device 106 determines the expected arrival time of each radio sferic as t0+D/c.

If a sensor detects a radio sferic within the window t0+D/c+/− a predetermined time window (e.g., 4 ms), this sensor is said to detect the group.

If a sensor does not detect a radio sferic within the window t0+D/c+/− the predetermined time window (e.g., 4 ms), this sensor is said to not detect the group.

If a sensor is too far away, the sferic data is not considered.

Exemplary radio sferic detection data for the sensors in FIG. 7A is shown in FIG. 7B. For example, the radio sferics for Sensor 1 704a and Sensor 2 704b are within the time window, so the server computing device 106 classifies the sferic data for theses sensors 704a-704b as a detection. The radio sferic for Sensor 3 704c is not within the time window, so the server computing device 106 classifies the sferic data for Sensor 3 as a non-detection. And, Sensor 4 704d is further than the defined distance (e.g., 1,000 km) away from the satellite group, so the server computing device 106 does not consider the sferic data for Sensor 4.

The server computing device 106 generates as output a collection of radio sferics associated with a satellite group. If the collection includes more than a certain number of radio sferics (e.g., four), the collection is used by the server computing device 106 to determine (608) location of the lightning. It should be appreciated that the arrival time of the radio sferic in the window can vary slightly from sensor to sensor. This is expected, because the satellite group location has some error in it. It is for this reason that the radio sferics can produce a more accurate location of the lightning process than the satellite.

Figure 8:
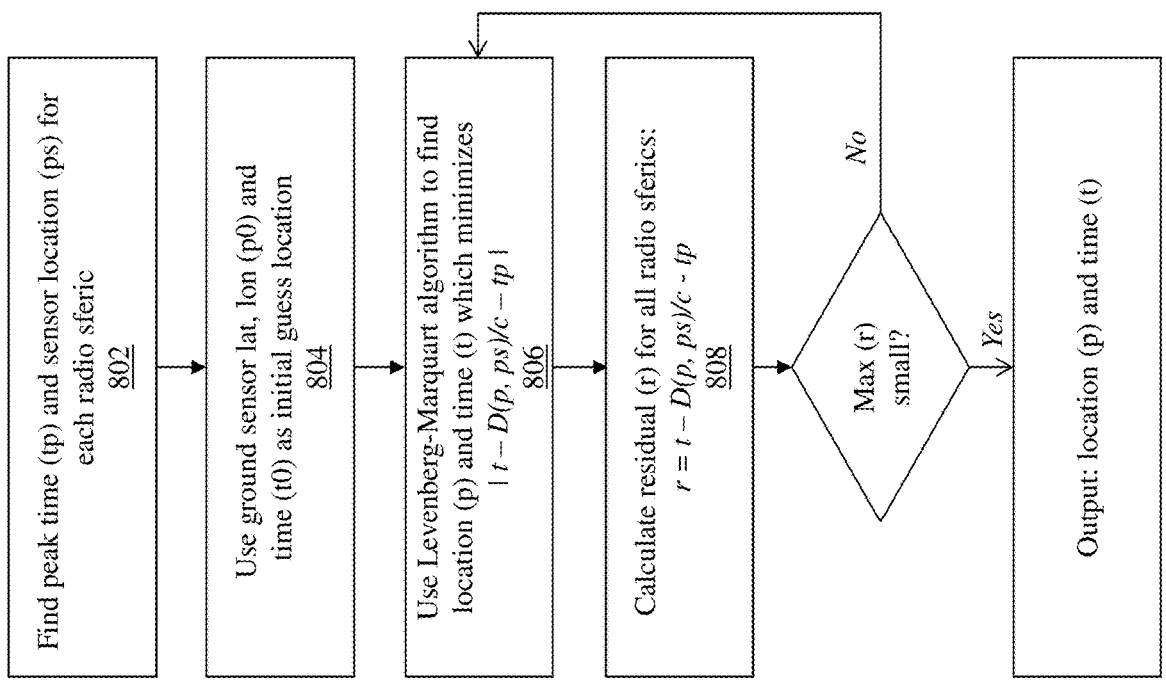
FIG. 8 is a flow diagram of a method for determining if of radio sferics converges on a location using satellite-based location as an initial guess.

The server computing device 106 determines if the collection of radio sferics converges on a location. FIG. 8 is a flow diagram of a method for determining if the collection of radio sferics converges on a location.

At step 802, the server computing device 106 finds peak times (tp) and sensor locations (ps) for each radio sferic in the collection;

At step 804, the server computing device 106 uses group location (lat, lon) (p0) and time (t0) of the satellite group as the initial guess location. It should be appreciated that the initial guess t0, p0 in 804 is much more accurate than the initial guess t0, p0 used in step 404 of FIG. 4, causing the algorithm to converge faster.

At step 806, the server computing device 106 uses a Levenberg-Marquardt algorithm to find location (p) and time (t) which minimizes |t−D(p,ps)/c−tp| for all radio sferics in the collection—where D(p, ps) is the distance between locations p and ps;

At step 808, the server computing device 106 calculates the residual (r) for all radio sferics in the collection: r=t−D(p,ps)/c−tp;

If r is small enough for all radio sferics in the collection, the server computing device 106 has determined that the collection has converged on a location. Otherwise, the server computing device 106 removes the radio sferic associated with the largest residual r and goes back to step 806.

If the server computing device 106 determines that the collection has converged on a location, the location is compared to the centroid location of the satellite group—as shown in, and described above with respect to, FIG. 5. If the collection location (black dot) is within a defined distance (e.g., 75 km) of the centroid location satellite group (grayscale squares) (502), the electric field sferic is deemed to have been produced by the same physical lightning process. The server computing device 106 uses the raw sferic data for the pulse to determine the peak current and the classification (IC/CG) for this pulse, and the server computing device 106 appends this information to the satellite group information.

If the collection location is within the bounds of the satellite group (504), in addition to the classification and peak current, the server computing device 106 also appends the location (lat, lon) determined by the ground-based sensors 104 to the satellite group information.

If the collection does not converge on a location, or the location is too far from the satellite group (506), or fewer than a certain number of sensors detect the pulse (e.g., four), no information is appended to the satellite group information.

Generally, the output data generated by the server computing device 106 is in netCDF format—similar to the format of the satellite 102 data, but with some additional fields for the additional information. In some embodiments, the server computing device 106 makes the output data available to further services, products, alerts, visualizations, and remote client computing devices (e.g., smartphones, tablets, smart watches, IoT devices, and the like).

Figure 9:
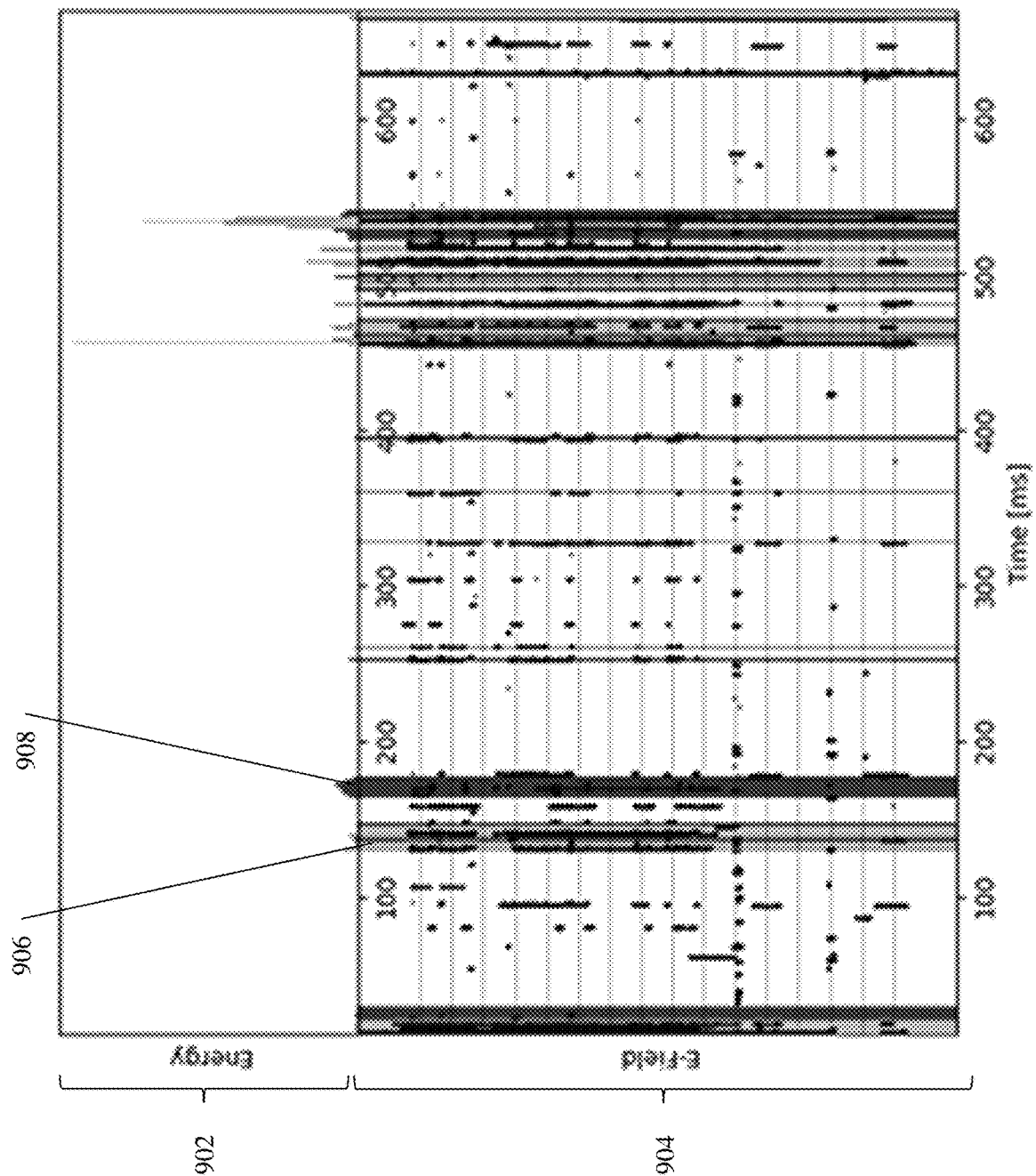
FIG. 9 is a diagram that depicts optical energy of lightning pulses as detected by the satellite and the electrical signals recorded by the ground-based sensors.

Under either of the above embodiments, the server computing device 106 can perform matching of the optical energy of the lightning pulses as detected by the satellite and the electrical signals recorded by the ground-based sensors. FIG. 9 is a diagram that depicts optical energy of lightning pulses 902 as detected by the satellite 102 and the electrical signals 904 recorded by the ground-based sensors 104. As shown in FIG. 9, the optical energy and the electrical signals do not match one-to-one. If the satellite 102 and the ground-based sensors 104 detect a signal, and the ground-based sensors 104 can locate the signal, the data are colored light gray (e.g., 906). If the ground-based sensors 104 cannot locate the signal, the data are colored dark gray (e.g., 908).

Figure 10:
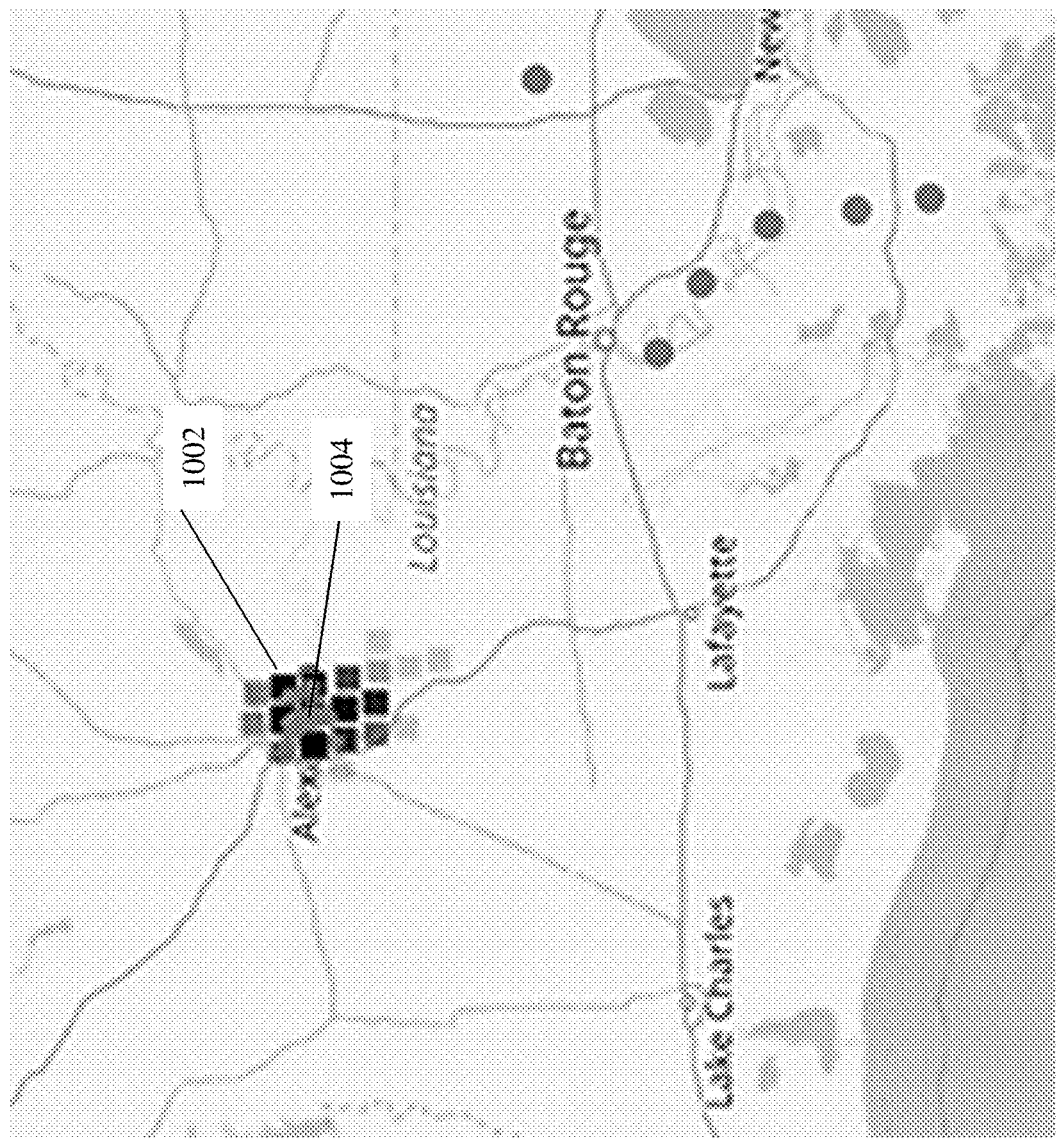
FIG. 10 is a map showing the location of the lightning pulses as determined by the server computing device.

FIG. 10 is a map showing the location of the lightning pulses as determined by the server computing device 106. As shown in FIG. 10, the black squares (e.g., 1002) show the locations of the optical pixels as seen by the satellite 102, and the light gray dots (e.g., 1004) are the locations as determined by the ground-based sensors 104 using the hybrid location technique described herein. Note that the clustering of the light gray dots for the ground-based sensor locations is tighter than that of the black squares for the satellite pixels, so the location accuracy of the satellite data has been improved.

Figure 11:
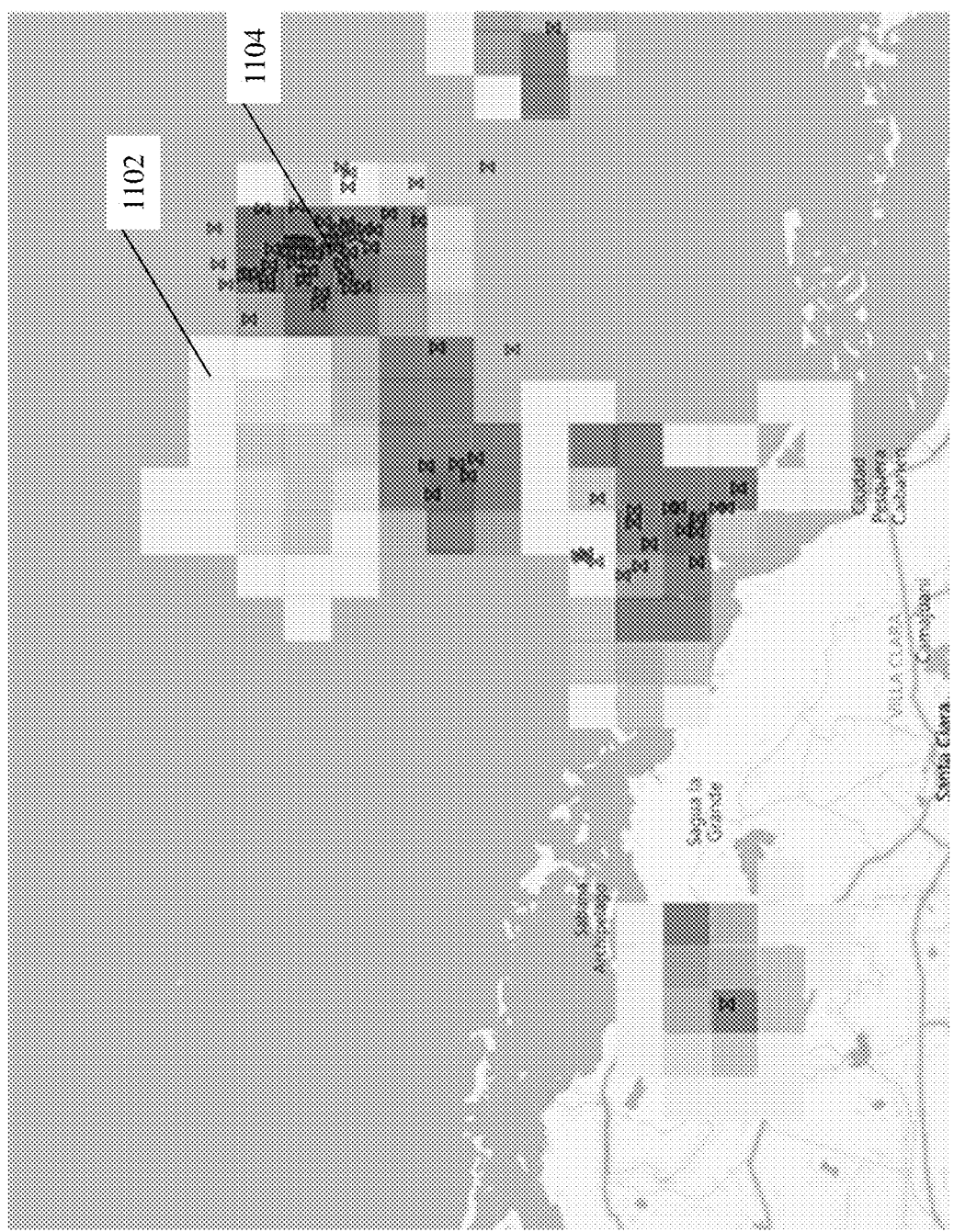
FIG. 11 is a screenshot of an exemplary user interface of an operational, real-time map containing the satellite-ground hybrid lightning location data as determined by the server computing device.

FIG. 11 is a screenshot of an exemplary user interface of an operational, real-time map containing the satellite-ground hybrid lightning location data as determined by the server computing device 106. The server computing device 106 can generate the map (and associated user interface) and transmit the map/UI to a remote computing device—such as client computing devices 102a-102n. In some embodiments, the map data is automatically updated at periodic intervals (e.g., every minute) by the server computing device 106. As shown in FIG. 11, the gray squares (e.g., 1102) show the locations of the optical pixels as seen by the satellite 102, and the bowties (e.g., 1104) are the locations as determined by the ground-based sensors 104 using the hybrid location technique described herein. Each bowtie also includes metadata such as lightning flash type and amplitude. For example, a user can view the metadata by interacting with the corresponding bowtie (e.g., by hovering over it or clicking it, which displays the metadata in a corner of the screen). It should be appreciated that other configurations of the map/UI can be contemplated within the scope of the technology described herein. Again, note the tight clustering of the ground-based sensor locations versus the gray squares of the satellite locations.

Occasionally, the signals are detected by both the satellite and ground-based sensors, but not well enough to get a location. In this case, the server computing device 106 can still provide classification and amplitude of the pulse.

In one embodiment, as mentioned above, the server computing device 106 can calculate the location using a 'time difference of arrival' algorithm. In some embodiments, the server computing device 106 can implement a more accurate (but, in some cases, computationally more expensive) Bayesian location technique. In one example, in regions that have many ground-based sensors, the system can achieve a location accuracy of ~100 m, while in regions with fewer ground-based sensors, the system can achieve a location accuracy of ~2 km. In one example, the server computing device 106 determines geographic coordinates (latitude, longitude) and time of the lightning process. The server computing device 106 also calculates other information about the lightning process, including peak current, type (e.g., intra-cloud, cloud-to-ground), and other metadata. In the event that fewer than four ground-based sensors 104 observe the lightning process (e.g., the lightning process occurred over the ocean), the server computing device 106 can still calculate certain information about the lightning process, such as peak current and type.

As can be appreciated, the techniques described herein of using lightning location data as detected by a satellite (also called satellite preconditioning) reduces the amount of computation needed to locate the lightning process using only data from the ground-based sensors 104 (for the 'Locate While Merging' implementation described above)—making the entire process more efficient, in some cases, by at least a factor of ten. In the case of using a traditional time-of-arrival location algorithm, the initial guess of location as provided by the satellite identifies which radio features are produced by a particular lightning process. This identification step is normally the most computationally expensive portion of lightning location. Further, the satellite preconditioning described herein also limits the geographic region in which the lightning process might be located. This allows other location techniques previously deemed computationally impractical, such as Bayesian location, to be employed, enabling increased LA and accurate calculations of the lightning process altitude—whereas previously, a Bayesian locator required computations to be made in a volume around the expected source location. The larger the volume is, the more calculations are required. By having an accurate initial guess as provided by the hybrid system 100, these calculations can be minimized. It is important to note that the combination of satellite lightning data and ground-based lightning data should be done during lightning location to realize all the benefits.

In some embodiments, the server computing device 106 includes an alert generation module (not shown). The alert generation module uses the analyzed characteristics of the lightning data, including the location information determined as described above, to automatically identify geographical areas that may be impacted by severe weather associated with the lightning data.

To issue an alert that reaches persons and/or entities that may be directly affected by the severe weather or that may have an interest in the affected area, the alert generation module determines one or more geographical areas at risk based on the location information determined from the satellite and ground-based sensor systems. In some embodiments, the alert generation module determines a warning area that corresponds to the current location of the lightning activity.

After determining one or more areas at risk, the alert generation module automatically identifies a set of one or more remote devices that are monitoring the at-risk areas and automatically transmits an alert to the remote devices. The remote devices can include computer-based devices, such as mobile phones and global positioning system (GPS) hardware. The remote devices can also include other types of warning systems, such as lights, sirens and horns that are configured to connect to a communications network. In some embodiments, the database 108 includes information related to identification of the remote devices (e.g., IP address, phone number, email address), and the alert generation module uses the identification information to prepare an alert for each remote device. The database 108 also includes information mapping the identification of a remote device to a particular geographic area or areas that the remote device is monitoring (e.g., zip code, county name, street address). The alert generation module uses any standard communication protocol or technique, such as packet-based delivery (e.g., text messaging, XML, email), circuit-based delivery (e.g., paging, voice messaging), and the like. For example, a user can subscribe to receive alerts for a particular zip code on his mobile phone. The system 100 stores the user's telephone number in the database 108. When the alert generation module identifies a geographic location that is at risk for severe weather and all or part of the identified location falls within the zip code submitted by the user, the alert generation module issues an alert (e.g., a text message, a voice message) addressed to the telephone number of the user's mobile phone. In this embodiment, the user's mobile phone need not be located in the same geographic area as identified by the alert generation module as "at risk."

The server computing device 106 can transmit lightning-related information to any number of remote devices equipped or capable of receiving them. For example, the server computing device 106 can transmit the information to a mobile device using standard communication techniques (e.g., cellular, wireless). As described above, the server computing device 106 can generate and issue severe weather alerts to remote devices—which allows for increased awareness of incoming severe weather. In some embodiments, the lightning data captured by the hybrid technique described herein can be merged or combined with the proxy lightning radar map visuals and data as described in U.S. Pat. No. 9,891,345, titled "Using lightning data to generate proxy reflectivity data," which is incorporated herein by reference.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc., and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A computerized method of locating lightning activity, the method comprising:
receiving, by a server computing device from a satellite that detects lightning activity occurring in a geographic region, a plurality of location coordinate pairs and corresponding time data associated with lightning activity detected by the satellite;
capturing, by the server computing device from at least one of one or more ground-based lightning sensors that detect lightning activity, lightning feature data for lightning activity detected by the at least one of one or more ground-based lightning sensors, the lightning feature data comprising radio sferic data;
generating, by the server computing device, a plurality of ground point locations based upon the lightning feature data captured from the ground-based lightning sensors, comprising, for each location coordinate pair:
determining a distance from the location coordinate pair received from the satellite to a location of each of the ground-based lightning sensors,
obtaining the radio sferic data from a first set of one or more ground-based lightning sensors that are located within a predetermined distance from the location coordinate pair received from the satellite,
determining an expected arrival time of the radio sferic data obtained from the first set of ground-based lightning sensors,
combining the radio sferic data from the first set of ground-based lightning sensors that has an expected arrival time within a predetermined threshold into a collection of radio sferic data,
determining a location of lightning activity associated with the collection of radio sferic data, comprising:
a) finding a peak time (tp) and a sensor location (ps) for each radio sferic in the collection of radio sferic data;
b) assigning the geographic coordinates (p0) and time data (t0) received from the ground-based lightning sensors as an initial guess location;
c) determining location (p) and time (t) for each radio sferic in the collection of radio sferic data that minimizes $|t-D(p,ps)/c-tp|$;
d) determining a residual value (r) for all radio sferics in the collection of radio sferic data using the equation: $r=t-D(p,ps)/c-tp$;
e) when (r) is below a predefined value for each radio sferic, identifying a location of the lightning activity based upon the determined locations for the radio sferics; and f) when (r) is not below a predefined value for at least one radio sferic, removing radio sferics from the collection of radio sferic data that have a residual value (r) above the predefined value and returning to step c); and classifying the identified location of lightning activity as a ground point location;

comparing, by the server computing device, the ground point locations and the location coordinate pairs received from the satellite to identify one or more sets of matched data;

augmenting, by the server computing device, for each set of matched data, the location coordinate pairs for the lightning activity received from the satellite with the lightning feature data captured from the ground-based lightning sensors;

generating, by the server computing device, an alert message using the augmented location coordinates for the lightning activity; and transmitting, by the server computing device, the alert message to one or more remote computing devices monitoring one or more geographical areas at risk from the lightning activity at the augmented location coordinates.

2. The method of claim 1, wherein the server computing device receives optical energy information associated with the detected lightning activity from the satellite.

3. The method of claim 1, wherein each ground point location comprises a location, a classification, an estimated peak current, and an estimated location accuracy.

4. The method of claim 1, wherein the comparing step comprises determining that a lightning event detected by one or more of the ground-based lightning sensors occurred within a predetermined time of a lightning event detected by the satellite and occurred within a predetermined distance from the lightning event detected by the satellite.

5. The method of claim 4, wherein the augmenting step comprises appending geographic coordinates, peak current, and classification from the ground-based lightning sensors to group data associated with the satellite.

6. The method of claim 1, wherein the comparing step comprises determining that a lightning event detected by one or more of the ground-based lightning sensors occurred within a predetermined time of a lightning event detected by the satellite, occurred outside a first predetermined distance from the lightning event detected by the satellite, and occurred inside a second predetermined distance of the lightning event detected by the satellite.

7. The method of claim 6, wherein the augmenting step comprises appending peak current, and classification from the ground-based lightning sensors to group data associated with the satellite.

8. The method of claim 1, wherein the comparing step comprises determining that a lightning event detected by one or more of the ground-based lightning sensors occurred outside of a predetermined time of a lightning event detected by the satellite or occurred outside a predetermined distance from the lightning event detected by the satellite.

9. The method of claim 8, wherein the augmenting step comprises leaving group data associated with the satellite unchanged.

10. A system for locating lightning activity, the system comprising a server computing device including a memory for storing computer-executable instructions and a processor for executing the computer-executable instructions, the processor executing the computer-executable instructions to:

receive, from a satellite that detects lightning activity occurring in a geographic region, a plurality of location coordinate pairs and corresponding time data associated with lightning activity detected by the satellite;

capture, from at least one of one or more ground-based lightning sensors that detect lightning activity, lightning feature data for lightning activity detected by the at least one of one or more ground-based lightning sensors, the lightning feature data comprising radio sferic data;

generate a plurality of ground point locations based upon the lightning feature data captured from the ground-based lightning sensors, comprising, for each location coordinate pair:

determining a distance from the location coordinate pair received from the satellite to a location of each of the ground-based lightning sensors, obtaining the radio sferic data from a first set of one or more ground-based lightning sensors that are located within a predetermined distance from the location coordinate pair received from the satellite, determining an expected arrival time of the radio sferic data obtained from the first set of ground-based lightning sensors, combining the radio sferic data from the first set of ground-based lightning sensors that has an expected arrival time within a predetermined threshold into a collection of radio sferic data, determining a location of lightning activity associated with the collection of radio sferic data, comprising:

a) finding a peak time (tp) and a sensor location (ps) for each radio sferic in the collection of radio sferic data;

b) assigning the geographic coordinates (p0) and time data (t0) received from the ground-based lightning sensors as an initial guess location;

c) determining location (p) and time (t) for each radio sferic in the collection of radio sferic data that minimizes $|t-D(p,ps)/c-tp|$;

d) determining a residual value (r) for all radio sferics in the collection of radio sferic data using the equation: $r=t-D(p,ps)/c-tp$;

e) when (r) is below a predefined value for each radio sferic, identifying a location of the lightning activity based upon the determined locations for the radio sferics; and f) when (r) is not below a predefined value for at least one radio sferic, removing radio sferics from the collection of radio sferic data that have a residual value (r) above the predefined value and returning to step c); and classifying the identified location of lightning activity as a ground point location;

compare the ground point locations and the location coordinate pairs received from the satellite to identify one or more sets of matched data;

augment, for each set of matched data, the location coordinate pairs for the lightning activity received from the satellite with the lightning feature data captured from the ground-based lightning sensors;

generate an alert message using the augmented location coordinates for the lightning activity; and transmit the alert message to one or more remote computing devices monitoring one or more geographical areas at risk from the lightning activity at the augmented location coordinates.

11. The system of claim 10, wherein the server computing device receives optical energy information associated with the detected lightning activity from the satellite.

12. The system of claim 10, wherein each ground point location comprises a location, a classification, an estimated peak current, and an estimated location accuracy.

13. The system of claim 10, wherein the comparing step comprises determining that a lightning event detected by one or more of the ground-based lightning sensors occurred within a predetermined time of a lightning event detected by the satellite and occurred within a predetermined distance from the lightning event detected by the satellite.

14. The system of claim 13, wherein the augmenting step comprises appending geographic coordinates, peak current, and classification from the ground-based lightning sensors to group data associated with the satellite.

15. The system of claim 10, wherein the comparing step comprises determining that a lightning event detected by one or more of the ground-based lightning sensors occurred within a predetermined time of a lightning event detected by the satellite, occurred outside a first predetermined distance from the lightning event detected by the satellite, and occurred inside a second predetermined distance of the lightning event detected by the satellite.

16. The system of claim 15, wherein the augmenting step comprises appending peak current, and classification from the ground-based lightning sensors to group data associated with the satellite.

17. The system of claim 10, wherein the comparing step comprises determining that a lightning event detected by one or more of the ground-based lightning sensors occurred outside of a predetermined time of a lightning event detected by the satellite or occurred outside a predetermined distance from the lightning event detected by the satellite.

18. The system of claim 17, wherein the augmenting step comprises leaving group data associated with the satellite unchanged.

19. A computerized method of locating lightning activity, the method comprising:
   receiving, by a server computing device from a satellite that detects lightning activity occurring in a geographic region, a plurality of location coordinate pairs and time data associated with lightning activity detected by the satellite;
   capturing, by the server computing device from at least one of one or more ground-based lightning sensors that detect lightning activity, lightning feature data for lightning activity detected by the at least one of one or more ground-based lightning sensors, the lightning feature data comprising radio sferic data;
   identifying, by the server computing device, at least one of the one or more ground-based lightning sensors in proximity to the geographic region based upon the location coordinate pairs and time data received from the satellite, comprising, for each location coordinate pair:
      determining a distance from the location coordinate pair received from the satellite to a location of each of the ground-based lightning sensors,
      obtaining the radio sferic data from a first set of one or more ground-based lightning sensors that are located within a predetermined distance from the location coordinate pair received from the satellite,
      determining an expected arrival time of the radio sferic data obtained from the first set of ground-based lightning sensors,
      combining the radio sferic data from the first set of ground-based lightning sensors that has an expected arrival time within a predetermined threshold into a collection of radio sferic data,
      identifying a second set of ground-based lightning sensors using the collection of radio sferic data, comprising:
         a) finding a peak time (tp) and a sensor location (ps) for each radio sferic in the collection of radio sferic data;
         b) assigning the geographic coordinates (p0) and time data (t0) received from the ground-based lightning sensors as an initial guess location;
         c) determining location (p) and time (t) for each radio sferic in the collection of radio sferic data that minimizes $|t-D(p,ps)/c-tp|$;
         d) determining a residual value (r) for all radio sferics in the collection of radio sferic data using the equation: $r=t-D(p,ps)/c-tp$;
         e) when (r) is below a predefined value for each radio sferic, identifying one or more ground-based lightning sensors that detected the radio sferic and assign the identified sensors to the second set of ground-based lightning sensors; and
         f) when (r) is not below a predefined value for at least one radio sferic, removing radio sferics from the collection of radio sferic data that have a residual value (r) above the predefined value and returning to step c);
   determining, by the server computing device, a location of the lightning activity using the lightning feature data from the second set of ground-based lightning sensors;
   generating, by the server computing device, an alert message using the location of the lightning activity; and
   transmitting, by the server computing device, the alert message to one or more remote computing devices monitoring one or more geographical areas at risk from the lightning activity at the location.

20. The method of claim 19, wherein the server computing device receives optical energy information associated with the detected lightning activity from the satellite.

21. The method of claim 19, wherein determining a location of the lightning activity comprises determining that a lightning event detected by one or more of the ground-based lightning sensors occurred within a predetermined time of a lightning event detected by the satellite and occurred within a predetermined distance from the lightning event detected by the satellite.

22. The method of claim 21, further comprising appending geographic coordinates, peak current, and classification from the identified ground-based lightning sensors to group data associated with the satellite.

23. The method of claim 19, wherein the determining a location of the lightning activity comprises determining that a lightning event detected by one or more of the ground-based lightning sensors occurred within a predetermined time of a lightning event detected by the satellite, occurred outside a first predetermined distance from the lightning event detected by the satellite, and occurred inside a second predetermined distance of the lightning event detected by the satellite.

24. The method of claim 23, further comprising appending peak current, and classification from the identified ground-based lightning sensors to group data associated with the satellite.

25. The method of claim 19, wherein determining a location of the lightning activity comprises determining that a lightning event detected by one or more of the ground-based lightning sensors occurred outside of a predetermined time of a lightning event detected by the satellite or occurred outside a predetermined distance from the lightning event detected by the satellite.

26. The method of claim 25, further comprising leaving group data associated with the satellite unchanged.

27. A system for locating lightning activity, the system comprising a server computing device including a memory for storing computer-executable instructions and a processor for executing the computer-executable instructions, the processor executing the computer-executable instructions to:
   receive, from a satellite that detects lightning activity occurring in a geographic region, a plurality of location coordinate pairs and time data associated with lightning activity detected by the satellite;
   capture, from at least one of one or more ground-based lightning sensors that detect lightning activity, lightning feature data for lightning activity detected by the at least one of one or more ground-based lightning sensors, the lightning feature data comprising radio sferic data;
   identify at least one of the one or more ground-based lightning sensors in proximity to the geographic region based upon the location coordinate pairs and time data received from the satellite, comprising, for each location coordinate pair:
      determining a distance from the location coordinate pair received from the satellite to a location of each of the ground-based lightning sensors,
      obtaining the radio sferic data from a first set of one or more ground-based lightning sensors that are located within a predetermined distance from the location coordinate pair received from the satellite,
      determining an expected arrival time of the radio sferic data obtained from the first set of ground-based lightning sensors,
      combining the radio sferic data from the first set of ground-based lightning sensors that has an expected arrival time within a predetermined threshold into a collection of radio sferic data,
      identifying a second set of ground-based lightning sensors using the collection of radio sferic data, comprising:
         a) finding a peak time (tp) and a sensor location (ps) for each radio sferic in the collection of radio sferic data;
         b) assigning the geographic coordinates (p0) and time data (t0) received from the ground-based lightning sensors as an initial guess location;
         c) determining location (p) and time (t) for each radio sferic in the collection of radio sferic data that minimizes $|t-D(p,ps)/c-tp|$;
         d) determining a residual value (r) for all radio sferics in the collection of radio sferic data using the equation: $r=t-D(p,ps)/c-tp$
         e) when (r) is below a predefined value for each radio sferic, identifying one or more ground-based lightning sensors that detected the radio sferic and assign the identified sensors to the second set of ground-based lightning sensors; and
         f) when (r) is not below a predefined value for at least one radio sferic, removing radio sferics from the collection of radio sferic data that have a residual value (r) above the predefined value and returning to step c);
   determine a location of the lightning activity using the lightning feature data from the second set of ground-based lightning sensors;
   generate an alert message using the location of the lightning activity; and
   transmit the alert message to one or more remote computing devices monitoring one or more geographical areas at risk from the lightning activity at the location.

28. The system of claim 27, wherein the server computing device receives optical energy information associated with the detected lightning activity from the satellite.

29. The system of claim 27, wherein determining a location of the lightning activity comprises determining that a lightning event detected by one or more of the ground-based lightning sensors occurred within a predetermined time of a lightning event detected by the satellite and occurred within a predetermined distance from the lightning event detected by the satellite.

30. The system of claim 29, further comprising appending geographic coordinates, peak current, and classification from the identified ground-based lightning sensors to group data associated with the satellite.

31. The system of claim 27, wherein determining a location of the lightning activity comprises determining that a lightning event detected by one or more of the ground-based lightning sensors occurred within a predetermined time of a lightning event detected by the satellite, occurred outside a first predetermined distance from the lightning event detected by the satellite, and occurred inside a second predetermined distance of the lightning event detected by the satellite.

32. The system of claim 31, further comprising appending peak current, and classification from the identified ground-based lightning sensors to group data associated with the satellite.

33. The system of claim 27, wherein determining a location of the lightning activity comprises determining that a lightning event detected by one or more of the ground-based lightning sensors occurred outside of a predetermined time of a lightning event detected by the satellite or occurred outside a predetermined distance from the lightning event detected by the satellite.

34. The system of claim 33, further comprising leaving group data associated with the satellite unchanged.

* * * * *